United States Patent [19]

Bernard et al.

[11] Patent Number: 4,959,144
[45] Date of Patent: Sep. 25, 1990

[54] COOKING OIL FILTRATION DEVICE HAVING LOCKING MEANS AND PERIPHERAL CHANNEL MEANS

[75] Inventors: Robin D. Bernard, Bothell; John G. Gardner, Woodinville, both of Wash.

[73] Assignee: Filtercorp, Inc., Bothell, Wash.

[21] Appl. No.: 303,854

[22] Filed: Jan. 30, 1989

[51] Int. Cl.⁵ .............................................. B01D 35/30
[52] U.S. Cl. .............................. 210/232; 210/257.1; 210/502.1; 210/503; 210/679; 210/805; 210/DIG. 8
[58] Field of Search ...................... 210/232, 502.1, 503, 210/510.1, 435, 196, 257.1, 679, 680, 805, DIG. 8

[56] References Cited

U.S. PATENT DOCUMENTS

| | | | |
|---|---|---|---|
| 2,477,404 | 7/1949 | Butt, Jr. | 210/DIG. 8 |
| 3,279,605 | 10/1966 | Shepherd | 210/DIG. 8 |
| 3,327,859 | 6/1967 | Pall | 210/502.1 |
| 3,356,218 | 12/1967 | Grudoski | 210/DIG. 8 |
| 3,707,907 | 1/1973 | Wilson et al. | 210/DIG. 8 |
| 3,849,312 | 11/1974 | Wecker | 210/DIG. 8 |
| 3,880,757 | 4/1975 | Thomason | 210/167 |
| 3,933,643 | 1/1976 | Colvin et al. | 210/504 |
| 3,968,741 | 7/1976 | Hunt | 210/DIG. 8 |
| 3,983,843 | 10/1976 | Johnson | 210/169 |
| 4,025,438 | 5/1977 | Gelman et al. | 210/503 |
| 4,032,457 | 6/1977 | Matchett | 210/505 |
| 4,043,916 | 8/1977 | Wecker, Sr. | 210/238 |
| 4,079,001 | 3/1978 | Haase et al. | 210/502.1 |
| 4,282,094 | 8/1981 | Mitchell | 210/DIG. 8 |
| 4,328,097 | 5/1982 | Whaley et al. | 210/DIG. 8 |
| 4,395,332 | 7/1983 | Klein | 210/505 |
| 4,517,082 | 5/1985 | Prudhomme | 210/117 |
| 4,591,434 | 5/1986 | Prudhomme | 210/117 |
| 4,623,455 | 11/1986 | Adcock | 210/168 |
| 4,668,390 | 5/1987 | Hurley et al. | 210/167 |
| 4,702,827 | 10/1987 | Wenzel | 210/DIG. 8 |
| 4,768,426 | 9/1988 | Nett | 210/167 |

OTHER PUBLICATIONS

Publication of Bunge Edible Oil Corporation (3 pages).

Primary Examiner—W. Gary Jones
Assistant Examiner—Cynthia L. Nessler
Attorney, Agent, or Firm—Christensen, O'Connor, Johnson & Kindness

[57] ABSTRACT

A method of filtering hot cooking oil including passing the oil through a screen to remove particulate matter and then pumping the oil under a relatively low positive pressure through a filter pad of uniform thickness and porosity composed in part of fibrous material and possibly other elements such as activated carbon and silica bound by a resin binder. Equipment for filtering cooking oil including a reservoir for storing strained oil, pump means for drawing oil from the reservoir and passing it under relatively low pressure through a filter pad of uniform thickness and porosity composed at least of fibrous material and possibly other elements such as activated carbon and silica bound by a resin binder and sealed in the base of a pressure chamber.

3 Claims, 5 Drawing Sheets

COOKING OIL FILTRATION DEVICE HAVING LOCKING MEANS AND PERIPHERAL CHANNEL MEANS

BACKGROUND OF THE INVENTION

1. Field of the Invention

This invention relates to a method and apparatus for filtering hot cooking oil such as that used in commercial deep fryers. In particular the invention relates to a method and apparatus for straining the oil by passing it under a relatively low positive pressure through a filter pad of substantially uniform thickness and pore opening held in a pressure chamber. The filter pad includes fibrous material and activated carbon held by a resin binder.

2. Description of the Prior Art

It has long been known that cooking oils, such as those used in commercial or institutional deep fryers, tend to become contaminated with such things as moisture and carbonized food particles during frying. The oils also tend to break down chemically after extended use, often causing the oil to foam, smoke, smell bad, look bad or taste bad. It has been found that keeping the cooking oil clean by removing the particulate matter and filtering it on a regular basis tends to extend the useful life of the cooking oil and increase the quality and appearance of foods which are cooked therein. In commercial and institutional cooking operations it has been found necessary to filter cooking oil as often as every eight hours. To reduce the down time of the cooking machine it is desirable to filter the oil while it is hot, usually in the 350° to 370° F. range, and to complete the filtering procedure as quickly as possible. While specialized filtering apparatus of many types have been proposed in the past, the filtration process has remained time consuming, disruptive of business and less than satisfactory in extending the life of the cooking oil.

In particular, equipment employing a vacuum to draw cooking oil downwardly through a filter which has been sprinkled with diatomaceous earth or the like has been employed in equipment sold by the Dean-Alco Company. Similar equipment is also disclosed in U.S. Pat. No. 4,043,916. Equipment employing a two step filtration process involving drawing the cooking oil through a relatively coarse filter by means of a vacuum and then pumping the cooking oil upwardly through a thick, tightly wound paper filter is disclosed in U.S. Pat. No. 4,517,082. Similar equipment employing a crepe paper filter is disclosed in U.S. Pat. No. 4,591,434.

It is also known to include a filtering system within a deep fat fryer for filtering oil on a continuing basis and U.S. Pat. No. 4,668,390 discloses such a device wherein the filter element comprises a carbon-impregnated cloth.

Attempts have been made to force cooking oil under high pressure downwardly through a filter loosely covered with diatomaceous earth or other particulate filtering material. Such equipment has proven unsuccessful because of the non-uniformity of the thickness and pore opening of the particulate material spread on the filter and the tendency of the oil to mainly pass through parts of the filter which are the least thickly covered with the particulate filter material. In addition, filtration at relatively high pressures, i.e., above 40 PSI, has been found to speed the chemical breakdown of cooking oil, thus shortening its useful life.

BRIEF SUMMARY OF THE INVENTION

A method and apparatus for filtering cooking oil is disclosed wherein the cooking oil is pumped under relatively low positive pressure, i.e., usually below 20 PSI, through a preformed filter pad of substantially uniform thickness and pore opening. A reservoir for holding hot cooking oil having a filter screen for removing larger pieces of particulate matter is disclosed. The equipment includes pump means for sucking oil from the reservoir and pumping it to a pressure vessel and thence down through the filter pad positioned near the bottom of the pressure vessel. The pressure vessel includes a unique pair of seals which prevent cooking oil from either passing around the outside of the filter pad and escaping from the pressure vessel. The filter pad includes fibrous material and usually activated carbon held together by a resin binder (and may be encased within a porous covering). The equipment includes pressure sensing means adapted to actuate a shut off mechanism when the pressure within the unit rises above a predetermined relatively low level, typically as a result of the filter pad becoming less porous due to the capture of material removed from the cooking oil.

DETAILED DESCRIPTION OF THE INVENTION

Figure 1:
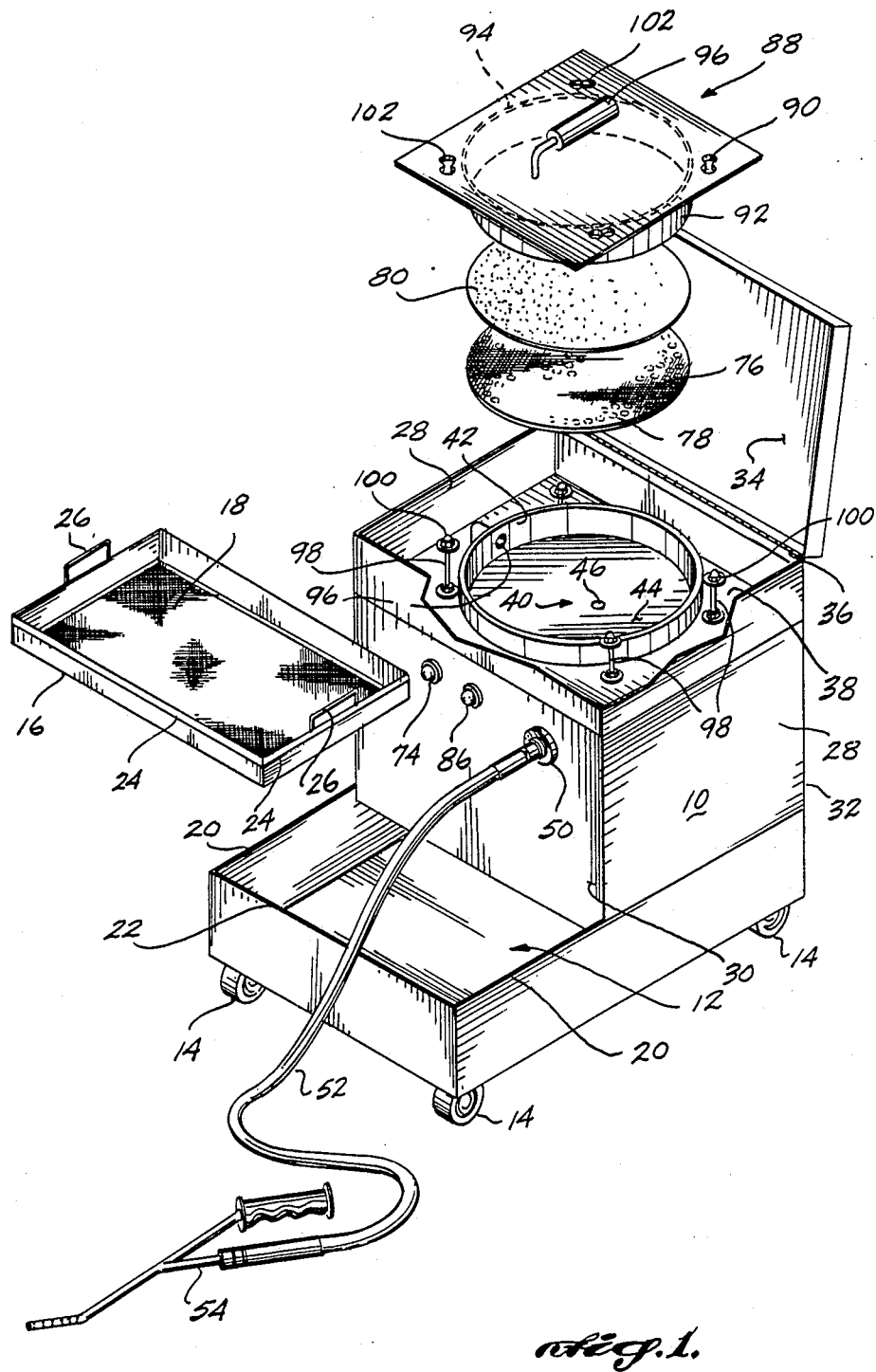
FIG. 1 is an exploded perspective view of one embodiment of an apparatus for filtering cooking oil made according to the present invention with portions thereof shown broken away.

Referring initially to FIG. 1, an apparatus for filtering cooking oil made according to the present invention is disclosed to comprise a cabinet 10 having an oil holding reservoir 12 positioned therebelow. The entire unit is mounted upon wheels 14 which allow the unit to be stored at a distance from a cooking machine, such as a commercial deep fryer, and then rolled to the vicinity of the cooking machine when the cooking oil therein is to be filtered.

Tray 16, having a screen 18 forming its bottom surface, is adapted to be mounted on the tops of side walls 20 and front wall 22 of the reservoir 12 in the opening in front of cabinet 10. Tray 16 includes flanges 24 which are adapted to slip over the top edges of walls 20 and 22 of the reservoir to hold the tray in place so that hot cooking oil drained from a cooking machine may be passed through screen 18 and into reservoir 12 to remove relatively large pieces of particulate matter from the cooking oil before it is pressure filtered in the manner to be described hereafter. Handles 26 are provided on tray 16 to allow the tray to be easily removed from the reservoir opening and the particulate matter discarded.

Cabinet 10 is composed of side walls 28, front wall 30 and a rear wall 32 which includes a door (not shown) opening into the inside of cabinet 10 in which the motor, pump and other components of the equipment reside as will be discussed hereafter.

Figure 2:
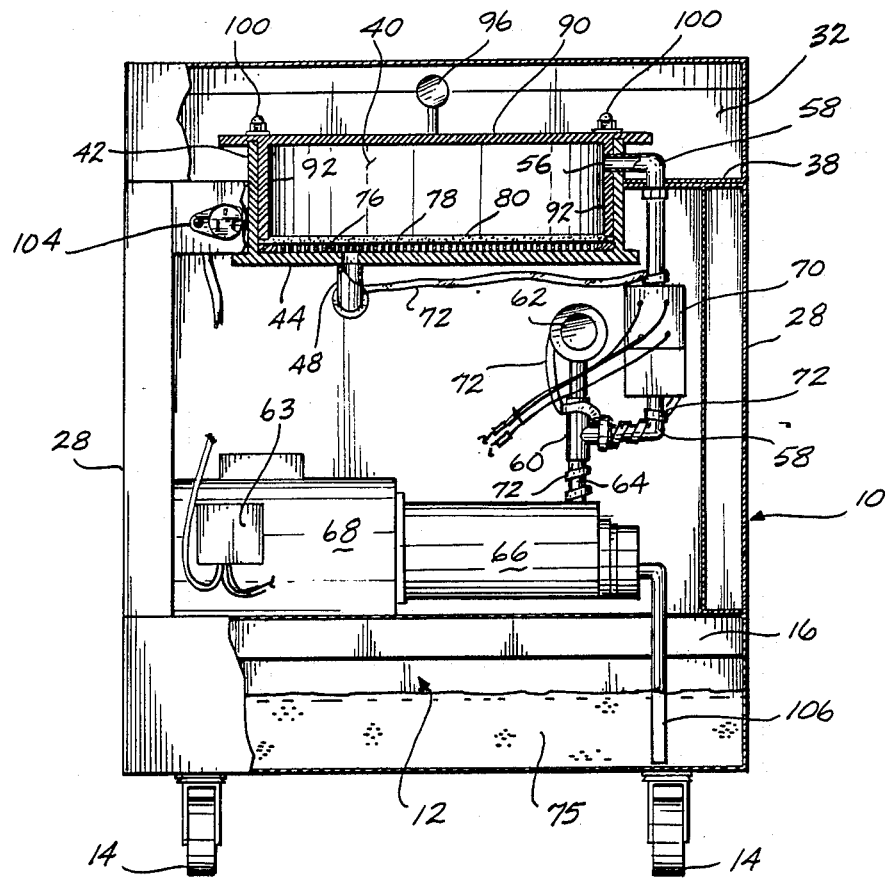
FIG. 2 is a rear elevation view of one embodiment of an apparatus made according to the present invention with portions thereof being broken away to better illustrate the configuration of the pressure vessel and cooking oil reservoir.
Figure 3:
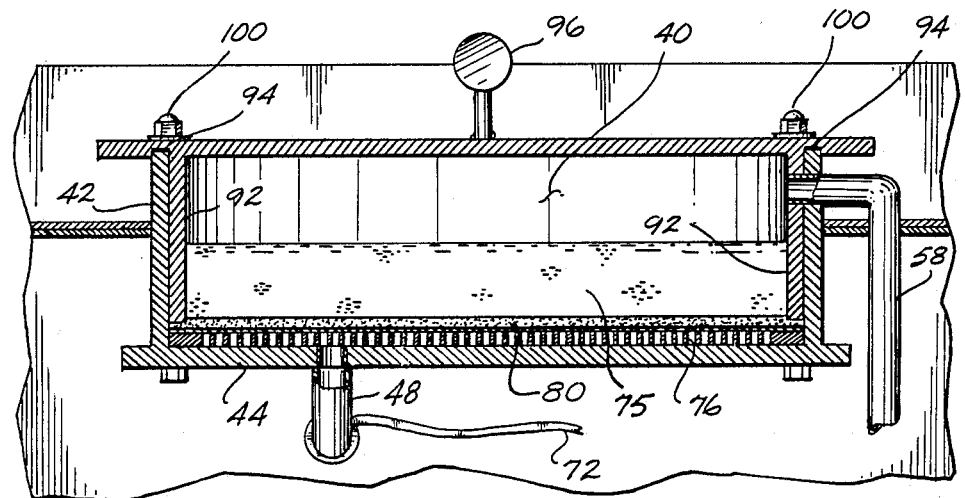
FIG. 3 is a partial sectional view of the pressure vessel and filter pad of the embodiment of FIGS. 1 and 2.

Cabinet 10 includes a top cover 34 which is adapted to pivot about hinge 36 mounted on the top surface of back wall 32. Recessed within the top of cabinet 10 is a shelf 38 in which a pressure vessel 40 is mounted. Referring additionally to FIGS. 2 and 3, pressure vessel 40 comprises a metal dish having a circular side wall 42 welded or otherwise integrally connected to a base member 44, and a cover to be described hereafter. Base member 44 includes an opening 46 connected to drain pipe 48 which runs to bayonet mount 50 positioned in front wall 30 of the cabinet 10. Mount 50 is adapted to receive a cooperating fitting on hose 52. Nozzle 54 is mounted on the distal end of hose 52 by means of which filtered oil is returned to a cooking machine in a manner to be described more fully hereafter.

Pressure vessel side wall 42 also includes an opening 56 interconnected to a pipe 58 which, as shown in FIG. 2, runs downwardly to a T-connection 60. T-connection 60 is, in turn, connected to a pressure sensor and switch 62 mounted on its upper end, and a pipe 64 running to pump 66. Pressure sensor and switch 62 is of a conventional type, and Model #MSPS-JJ100SS manufactured by Imo-Barksdale Controls has been found satisfactory although other devices of similar function could also be used.

Pump 66 is of a conventional type which may be driven by an integral motor 68 or by a separate motor unit. In practice, it has been found that motor 68 is preferably of a ⅓-horsepower size. A combined gear pump and motor unit having a 2 g.p.m. capacity and manufactured by Baker-Haight, and sold under part number 3D023001, has been found satisfactory for use at the pressure levels and with the filter pads disclosed.

Referring particularly to FIG. 2, a thermostat 70 is shown mounted on pipe 58 and is adapted to sense the temperature within the pipe. As shown in FIG. 2, pipes 48, 58 and T-connection 60, are all wrapped with heat tape 72 such that hardened oil within the pipes may be melted prior to hot oil being pumped therethrough during filtering. A temperature thermostat such as the Chromalox No. R5135C has been found satisfactory for use herein as has heat tape sold by the same company under No. CWM12-1. The thermostat is electrically interconnected to green signal light 74 mounted on the front surface 30 of cabinet 10. The first step in using the equipment is heating the piping by energizing heat tape 72. When the temperature within pipe 58 reaches a pre-set temperature, such as 115° F, thermostat 70 automatically turns off the heat tape and turns on green light 74, indicating to the operator that cooking oil 75 may be pumped from the reservoir to the pressure vessel for filtration in the manner to be described hereafter.

Referring again to FIG. 1, pressure vessel 40 is shown to include a metal spacing grid 76 which may have a screen 78 positioned on its upper surface to provide a uniform support base for filter pad 80 which is adapted to be positioned thereon. It is also contemplated that pressure vessel 40 may be formed by casting and that grooves or ridges may be cast directly into the base thus eliminating the need for spacing grid 76, although it may be desirable to still make use of screen 78.

Figure 4:
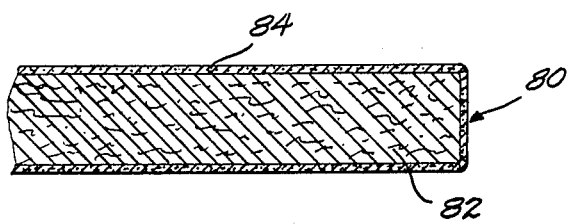
FIG. 4 is a partial sectional view of a filter pad made according to the present invention.

Referring additionally to FIG. 4, filter pad 80 is shown to comprise a wafer 82 composed at least in part of fibrous material and activated carbon bound together by a resin to produce a filter pad which is substantially uniform in thickness and porosity. To better maintain the integrity of the unit and prevent the discharge of particles of the pad into the air during handling, a porous covering 84 may be placed thereover although such may not typically be used. In a preferred embodiment, the pad may be formed of pulp fiber, calcium silicate and carbon cellulose bound together by a conventional resin binder. Covering 84, if used, may be formed of conventional filter sheet material or the like. The particular components of the pad may vary, but of key importance is the fact that it is substantially uniform in thickness and porosity and thus acts to provide effective filtration of the cooking oil under the positive pressure generated by pump 66 as compared with the unsatisfactory results achieved using a loose particulate covering randomly deposited on a filter paper combined either with a vacuum pulling the oil through the filter or a high pressure pump. The unique pad provides an effective handling and delivery system for fiber, carbon and possibly toxic synthetic silicates which could constitute, at worst, a health hazard for workers if handled as loose particulate matter, or at least, a messy, ineffective, non-uniform and difficult to handle filtration media.

Filter pads 80 are preformed by conventional methods and, as described below, are easily replaced within the pressure vessel after the porosity of the filter pad has degraded to the point where the pressure within the system exceeds 40 PSI. At this point, pressure sensor 62 and its associated conventional relay turns on red light 86 positioned on the front panel 30 of cabinet 10 and turns the pump and motor off to prevent further operation of the equipment until the filter pad is replaced, thus again allowing the equipment to function at the desired 5-20 PSI pressure. Testing has disclosed that operation of the equipment at the relatively low 5-20 PSI allows the cooking oil to be filtered with minimal degradation of the oil. Forcing cooking oil through a filter at higher pressures has been found to significantly shorten the life of the cooking oil. Testing has also disclosed that the present unit typically operates in the 5-20 PSI range and that once the pressure exceeds 20 PSI it rapidly rises to 40 PSI, often within a minute, thus causing the pressure sensor and relay to shut the equipment down until the pad is replaced. In normal use, only a relatively small amount of cooking oil, typically less than 20%, is filtered at a pressure above 20 PSI and none above 40 PSI. While the pressure sensor could be set at 20 PSI or at other levels in this range, thus preventing any cooking oil from being filtered above this level, this could result in premature and uneconomic replacement of filter pads in situations where pressure spikes shut the equipment down before the filter pad is saturated with debris to such a degree that cooking oil degradation has become a serious problem. The 40 PSI shut off level has been found to be reasonable for the present equipment and filters in that the equipment provides high-quality filtering with minimal degradation of the cooking oil at a relatively low cost.

In the embodiment of FIGS. 1-3, pressure vessel 40 is closed by cover 88 which, as shown, comprises a top plate portion 90 and a downwardly depending circular lip 92 which is sized to fit snugly within walls 42 of the pressure vessel silicon gasket. As is best shown in FIG. 3, the bottom portion of lip 92 is adapted to rest upon the periphery of filter pad 80, thus pressing it firmly against spacer 76 and preventing the passage of oil around the edges of the filter pad. In this way, all of the cooking oil to be filtered is forced through the central body portion of filter pad 80 and thence downwardly through the holes in spacer 76 and into drain pipe 48. As is also shown in FIG. 3, top plate 90 includes a channel 94 in its lower surface immediately outwardly adjacent the downwardly depending lip 92. Channel 94 is adapted to receive the top portion of pressure vessel walls 42 to form a second seal which prevents the escape of hot oil from the pressure vessel. In use, a conventional O-ring or gasket is positioned in the bottom of channel 94 to further help seal this joint. Cover 88 includes a handle 96 and is adapted to be held in place by any conventional clamping system. As illustrated, four bolts 98 having fixed nuts 100 positioned on their upward ends are shown mounted to extend upwardly from shelf 38 and spaced around the periphery of the pressure vessel 40. Cover 88 includes cooperating openings 102 of generally figure eight shape. One portion of each opening is large enough to slip over nuts 100 to allow the cover to be positioned upon vessel 40. Further depression of the cover by compressing filter pad 80 coupled with rotation of the cover such that the smaller portions of opening 102 are moved under nuts 100, causes the cover to be firmly held in place during pressure filtering. It is contemplated that other conventional sealing systems for pressure vessel 40 may be used. It will be understood that replacement of filter pad 80 is easily accomplished by simply removing cover 88 and withdrawing and replacing the clogged pad with a fresh one.

In operation to filter cooking oil, the unit is rolled adjacent a deep fryer or other cooking vessel and electrical outlet 104 is connected to a source of power. Power is initially directed to heat tape 72 which warms the piping through which the cooking oil is to be pumped, thus melting any cooking oil which has hardened within the piping and which would otherwise either prevent the free flow of cooking oil or raise the pressure at which the unit operates to such a point that the pressure sensor and relay would turn the unit off.

Once the temperature within the piping reaches a level sufficient to melt any hardened oil therein, 115° having been found to be a safe temperature, thermostat 70 senses this temperature and turns green light 74 on. The unit is then ready to filter oil.

Cooking oil 75 is drained from the cooking machine in a conventional manner and poured through screen 18 in tray 16 into reservoir 12. Particulate matter within the cooking oil such as carbonized parts of food, is trapped by the screen and thus can be removed from the cooking oil before the oil is pumped through filter pad 80 thereby extending the life of the filter pad. It will be understood that filling of the reservoir may take place at the same time the heat tape is melting any hardened oil in the piping system of the unit.

After green light 74 has turned on, pump 66 may be actuated to draw cooking oil from reservoir 12 through pipe 106 upwardly into the pump 66 and then upwardly through pipes 64 and 58 through opening 56 into closed pressure vessel 40. As stated before, the pressure within the system is continuously sensed by pressure sensor 62 and normally operates at a pressure between 5 and 20 PSI. The pressure within the system forces the cooking oil through filter pad 80 which typically has a uniform opening size in the 5-20 micron range thus allowing the filter pad to capture all particles of larger size such that the cooking oil which passes through the filter and out drain pipe 48 contains no particles of larger size. The filtered cooking oil passes through hose 52 and nozzle 54 and is redirected back to the cooking machine. The entire filtration process for a normal load of cooking oil in the 8-10 gallon range, or approximately 55 lbs. of oil, typically takes between 5 and 8 minutes and thus the temperature drop of the cooking oil during filtering is relatively small. This allows the cooking machine to be placed back in service in a relatively short time after the filterer cooking oil is returned to the unit.

When filter pad 80 has captured an amount of particulate matter such that the pores of the filter pad have become clogged to the extent that the pressure needed to force oil through the filter exceeds 40 PSI, pressure sensor 62 and its associated relay 63 such as General Electric Model No. CR4RA22EA, turn motor 68 and associated pump 66 off and turn red light 86 on thus informing the operator that filter pad 80 must be replaced. As a safety measure, the relay prevents operation of the motor until such time as the filter is replaced and the pressure within the system drops below 40 PSI. Should oil, for any reason, escape from pressure chamber 40 onto shelf 38, an overflow drain 39 is provided to return oil to reservoir 12.

Filter pad 80 is uniform in thickness, the thickness of the pad typically being between $\frac{1}{8}$- and $\frac{1}{4}$-inch and of a diameter sufficient to fill the bottom of the pressure vessel and be captured by downwardly depending lips 92. The method and apparatus disclosed uniquely provides for thorough and quick filtration. Use of a filter pad of uniform thickness and porosity allows the pressure over the entire pad to be uniform as can readily be seen by examination of the even deposit of filtered material spread over filter pads which have become clogged and are to be disposed of.

Figure 5:
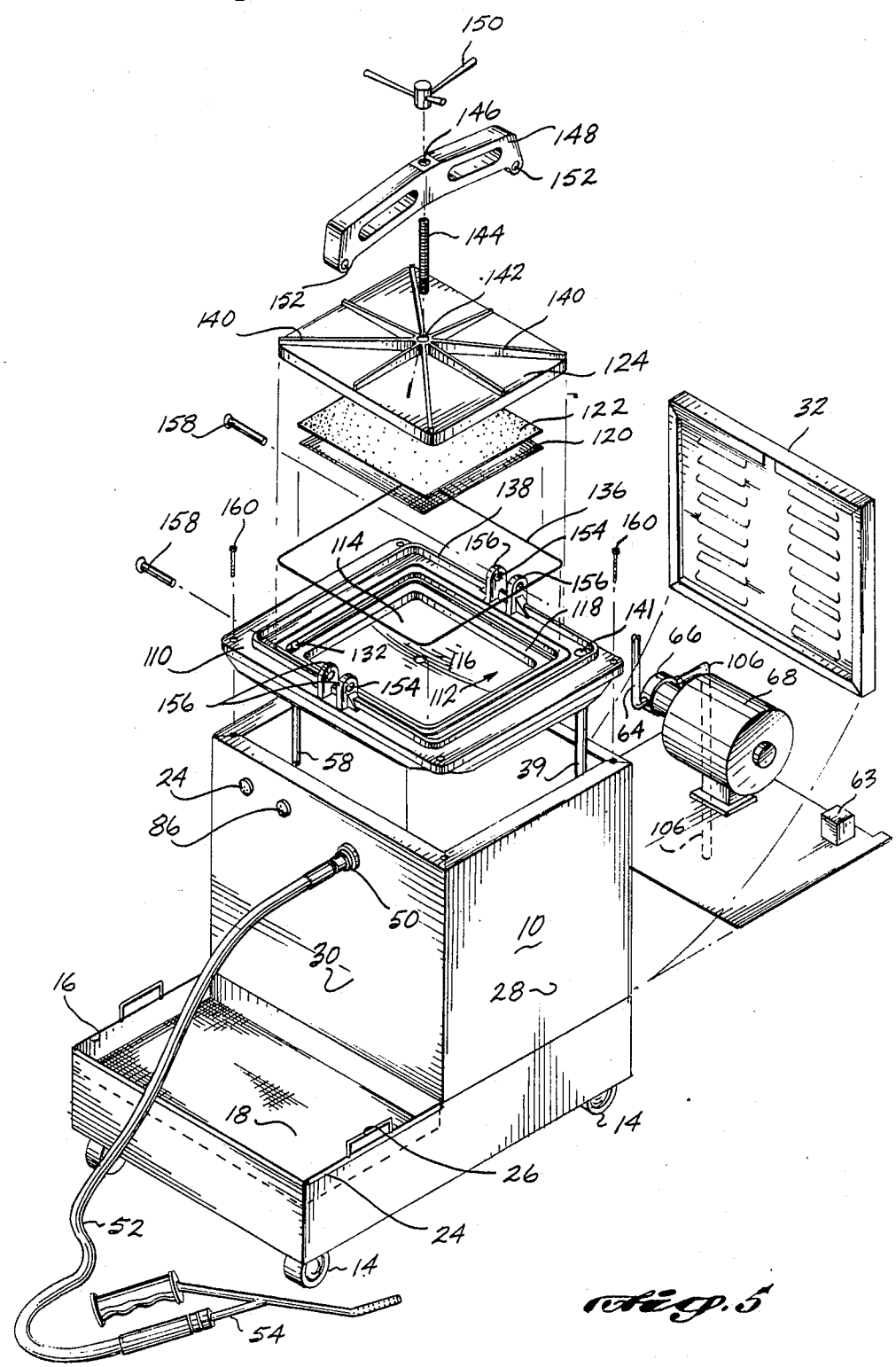
FIG. 5 is a partial exploded perspective view of another embodiment of an apparatus for filtering oil.
Figure 6:
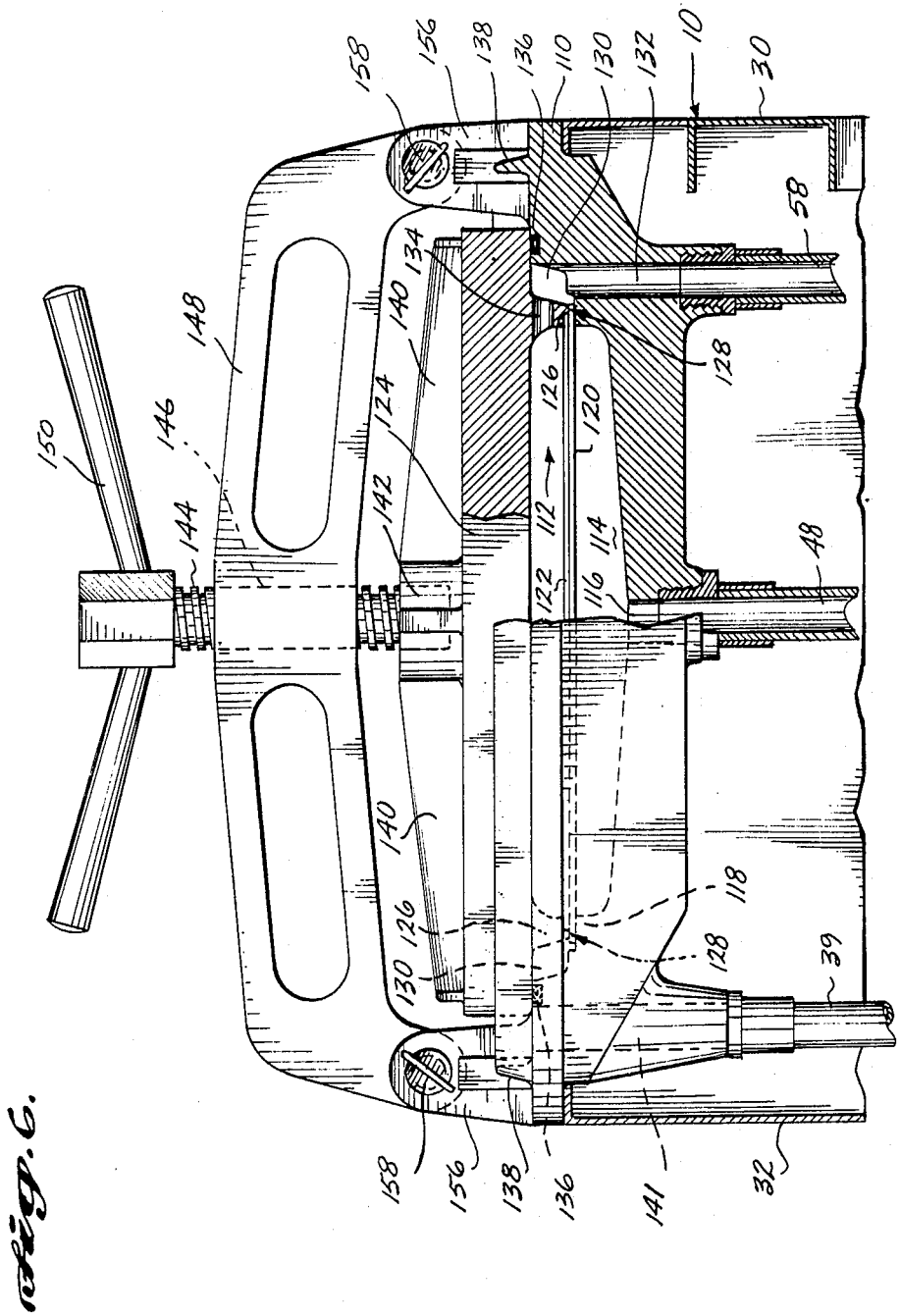
FIG. 6 is a partial sectional side elevation view of the assembled pressure vessel and filter pad of the embodiment of FIG. 5, with portions thereof shown broken away.

Referring additionally to FIGS. 5 and 6, a second alternative embodiment of a filtration apparatus made according to the present invention is disclosed. The principal difference between the embodiments of FIGS. 5 and 6 and FIGS. 1-3 lies in the configuration of the pressure vessel and its closing mechanism. Other than the differences described hereafter, this embodiment functions in like manner to the embodiment of FIGS. 1-3 discussed above, and like elements in the embodiment of FIGS. 5 and 6 have been numbered to correspond with elements of FIGS. 1-3. It will be understood that those elements not shown in FIGS. 5-6, and including in particular the wiring and plumbing of the unit, may be the same as illustrated in the embodiment of FIGS. 1-3.

Referring initially to FIG. 5, the top portion of cabinet 10 is formed by a shelf 110 in which a centrally located pressure vessel 112 is mounted. Pressure vessel 112 comprises a lower filtered oil collection portion 114 having a central drain 116 interconnected to a conduit such as 48 which leads to bayonet mount 54 for hose 52. Collection portion 114 is molded in shelf 110 and includes a surrounding shoulder 118 which is adapted to receive support screen 120 for filter pad 122. Filter pad 122 is shown to be rectangular in shape, but other than its difference in shape is identical to filter pad 80 discussed heretofore with respect to the embodiment of FIGS. 1-3.

Referring particularly to FIG. 6, it will be seen that the upper portion of pressure vessel 112 is defined by cover 124 which includes a downwardly depending lip 126 extending around the bottom surface of cover 124 near its periphery. Lip 126 is adapted to bear against pad 122 and screen 120 to form a first seal 128 around the periphery of the pressure vessel to hold the pressurized cooking oil therewithin. Peripheral channel 130 is positioned outside of seal 128 and, as shown in FIG. 6, is interconnected with pipe 58 through a molded conduit 132 in shelf 110 through which cooking oil to be filtered is pumped from reservoir 12. Channel 130 is interconnected with the upper portion of pressure vessel 112 by means of one or more channels 134 (FIG. 6) formed in downwardly depending lip 126 such that cooking oil to be filtered is pumped into the pressure vessel and thence downwardly through filter pad 122.

O-ring 136 is positioned outwardly of channel 130 to form a second seal between shelf 110 and cover 124 to prevent cooking oil from escaping from pressure chamber 112. Notwithstanding the provision of this double seal, catchment wall 138 surrounds cover 124 to catch any oil which might somehow escape from the pressure vessel, either during operation or during replacement of a clogged filter pad. Conduit 141 is molded in shelf 110 to function as a drain from the catchment area to pipe 39 which returns any oil in the catchment area to reservoir 12.

It will be understood that easy access to the inside of the pressure vessel is desired to allow for replacement of clogged filter pads during filtering. It is also critical that the cover seal of the pressure vessel be tight to prevent pressurized oil from escaping during filtration. To this end, lid 124 is provided with a plurality of strengthening ribs 140 which extend outwardly from a central cup 142 which is adapted to receive the bottom portion of threaded rod 144. Rod 144 extends through cooperatively threaded opening 146 in cover spanning beam 148. A handle 150 is fixed on the upper portion of threaded rod 144 to allow the threaded rod to be quickly rotated upwardly or downwardly through opening 146.

Beam 148 includes a pair of laterally extending openings 152 which are adapted to be aligned with openings 154 in upstanding ears 156 mounted on shelf 110 outwardly of the pressure vessel. Locking pins 158 are adapted to be inserted through openings 152 and 154 to hold the ends of beam 148 in place.

With beam 148 pinned in place and spanning cover 124, it will be understood that rotation of rod 144 downwardly through opening 146 in beam 148 will cause rod 144 to exert pressure upon the center portion of cover 124 to firmly seal the pressure vessel. When the pressure vessel needs to be opened to change a clogged filter pad, rod 144 is simply rotated upwardly to relieve pressure on the lid, one of the pins 158 removed from ears 156, and beam 148 pivoted upwardly around the remaining pin 158. Cover 124 may then be lifted and removed to expose the clogged filter pad 122 to be replaced. After replacement with a new filter pad, the lid is again sealed on the pressure vessel by simply reversing this procedure. Other lid sealing systems could, of course, be provided, but the system of FIGS. 5 and 6 has been shown to provide a relatively simple, easy to operate, secure closure.

It will be understood that shelf 110, including the pressure vessel and lid sturcture, forms an integral unit which may be readily mounted, such as by means of bolts 160, to cabinet 10, or to the cabinet of any cooking oil filtration unit having a pump system compatible with the relatively low pressures at which it has been found desirable to operate the present invention. As such, the shelf and pressure vessel unit disclosed in FIGS. 5 and 6 may be used as a retrofit unit to improve cooking oil filtration units already in use in restaurants or the like so that the improved method of the present invention may be used.

While the preferred embodiments have been illustrated and described, it is to be understood that variations will be apparent to those skilled in the art. Accordingly, the invention is not to be limited to the specific embodiments illustrated and described, and the true scope and spirit of the invention are to be determined by reference to the appended claims.

The embodiments of the invention in which an exclusive property or privilege is claimed are defined as follows:

1. Apparatus for filtering cooking oil comprising:
   a reservoir adapted to hold cooking oil removed from a cooking machine prior to filtering;
   screen means associated with said reservoir through which cooking oil is passed to remove particulate matter prior to filtering;
   a pressure chamber means;
   pump means adapted to draw cooking oil from the reservoir and pump it under a pressure of less than 40 PSI, into said pressure chamber means and thence downwardly through a filter pad mounted in the bottom of the pressure chamber means;
   said filter pad being formed of a combination of elements including fiber bound by a resin;
   said pressure chamber means including a peripheral gasket and a cover having a downwardly depending lip inward of said gasket, such that when said cover is closed a pair of seals are formed by said lip bearing against the periphery of said filter pad and said cover bearing against said gasket, such that cooking oil passes substantially uniformly through all portions of said filter pad inwardly of its periphery.

2. Apparatus for filtering cooking oil comprising:
   a reservoir for holding hot cooking oil to be filtered;
   means defining a pressure chamber;
   pump means adapted to draw cooking oil from said reservoir and pump said oil to said pressure chamber means; and
   filter pad means of substantilly uniform thickness and porosity comprising at least fiber and charcoal bound by a resin positioned within said pressure chamber means such that said cooking oil is forced therethrough under positive pressure;
   said pressure chamber means including means for supporting said filter pad means positioned on the downstream side of said pad means; cover means positioned above said pad means including downwardly extending lip means adapted to bear against the peripheral edge of said pad means to prevent oil from passing around said pad means; and, means for locking said cover means in place to seal said chamber means and hold said pad means against said support means, said means for locking cover means to seal said pressure chamber means including screw means and a bar means fixed to span the top of said cover means; said screw means being threaded through said bar means and being adapted to bear against said cover means to seal said pressure chamber means as said screw means is rotated downwardly through said bar means.

3. Apparatus for filtering cooking oil comprising:

a reservoir for holding hot cooking oil to be filtered;

means defining a pressure chamber;

pump means adapted to draw cooking oil from said reservoir and pump said oil to said pressure chamber means; and filter pad means of substantially uniform thickness and porosity comprising at least fiber and charcoal bound by resin positioned within said pressure chamber means such that said cooking oil is forced therethrough under positive pressure;

said pressure chamber means including means for supporting said filter pad means positioned on the downstream side of said pad means; cover means positioned above said pad means including downwardly extending lip means adapted to bear against the peripheral edge of said pad means to prevent oil from passing around said pad means; and, means for locking said cover means in place to seal chamber means and hold said pad means against said support means, said pressure chamber means further including a peripheral channel means in communication with said pump means and conduit means extending from said channel means through the downwardly extending lip means of said cover means through which oil to be filtered is pumped.

* * * * *